US006980964B1

(12) United States Patent
Cocotis et al.

(10) Patent No.: US 6,980,964 B1
(45) Date of Patent: Dec. 27, 2005

(54) VIRTUAL PRINT MARKET PLACE

(75) Inventors: Thomas A. Cocotis, Huntington Beach, CA (US); Donald Parke Gibson, Yorba Linda, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 09/627,401

(22) Filed: Jul. 27, 2000

(51) Int. Cl.$^7$ ............................................. G06F 17/60
(52) U.S. Cl. ............................ 705/26; 705/14; 705/28; 705/8; 705/400; 358/1.1; 358/1.15; 400/76
(58) Field of Search ............................. 705/26, 27, 37, 705/40, 8, 14, 28, 400; 358/1.1, 1.15; 400/76; G06F 17/60

(56) References Cited

U.S. PATENT DOCUMENTS

| | | | |
|---|---|---|---|
| 5,287,194 A * | 2/1994 | Lobiondo | 358/296 |
| 5,664,115 A | 9/1997 | Fraser | 705/37 |
| 5,666,215 A | 9/1997 | Fredlund et al. | 358/487 |
| 5,732,400 A | 3/1998 | Mandler et al. | 705/26 |
| 5,758,328 A | 5/1998 | Giovannoli | 705/26 |
| 5,760,916 A | 6/1998 | Dellert et al. | 358/408 |
| 5,760,917 A | 6/1998 | Sheridan | 358/442 |
| 5,826,244 A * | 10/1998 | Huberman | 705/37 |
| 5,878,416 A | 3/1999 | Harris et al. | 707/10 |
| 5,895,454 A | 4/1999 | Harrington | 705/26 |
| 5,907,831 A * | 5/1999 | Lotvin et al. | 705/14 |
| 5,918,207 A * | 6/1999 | McGovern et al. | 705/1 |
| 5,926,288 A | 7/1999 | Dellert et al. | 358/487 |
| 5,943,408 A | 8/1999 | Chen et al. | 379/207 |
| 5,970,472 A | 10/1999 | Allsop et al. | 705/26 |
| 5,974,401 A * | 10/1999 | Enomoto et al. | 705/40 |
| 6,017,157 A | 1/2000 | Garfinkle et al. | 396/639 |
| 6,047,259 A * | 4/2000 | Campbell et al. | 705/3 |
| 6,055,512 A | 4/2000 | Dean et al. | 705/17 |
| 6,133,985 A | 10/2000 | Garfinkle et al. | 355/40 |
| 6,148,293 A * | 11/2000 | King | 705/35 |
| 6,178,407 B1 * | 1/2001 | Lotvin et al. | 705/14 |
| 6,208,857 B1 | 3/2001 | Agre et al. | 455/428 |
| 6,208,974 B1 * | 3/2001 | Campbell et al. | 705/3 |
| 6,324,521 B1 * | 11/2001 | Shiota et al. | 705/27 |
| 6,330,542 B1 * | 12/2001 | Sevcik et al. | 705/8 |
| 6,330,551 B1 * | 12/2001 | Burchetta et al. | 705/80 |

(Continued)

FOREIGN PATENT DOCUMENTS

EP               1223530 A2 *    7/2002          G06F 17/60

(Continued)

OTHER PUBLICATIONS

Derwent-AcC-No.: 1998-287431, May, 1998, Location and service-provider selection . . . , see the abstract.*

(Continued)

*Primary Examiner*—Cuong H Nguyen
(74) *Attorney, Agent, or Firm*—Fitzpatrick, Cella, Harper & Scinto

(57) ABSTRACT

A method to create a virtual print market place using one or more interconnected computers comprising collecting market information comprising an identity of service providers and the print services and pricing provided by each, obtaining criteria established by an interactive shop for selecting service providers to provide print services offered to patrons of the interactive shops; and selecting service providers to provide the set of print services based on the criteria and the market information. In another aspect, a method of creating a market place is provided comprising obtaining bids from service providers identifying print services and terms for providing the print services as well as from interactive shops identifying print services and terms for purchasing the print services and establishing an agreement between the service provider and the interactive shop when the terms are compatible.

15 Claims, 12 Drawing Sheets

U.S. PATENT DOCUMENTS

| | | | |
|---|---|---|---|
| 6,430,178 B1 | 8/2002 | Yahiro | 370/356 |
| 6,438,219 B1 * | 8/2002 | Karau et al. | 379/112.01 |
| 6,442,525 B1 * | 8/2002 | Silverbrook et al. | 705/1 |
| 6,448,979 B1 * | 9/2002 | Schena et al. | 345/741 |
| 6,473,502 B1 * | 10/2002 | Karau et al. | 379/221.13 |
| 6,473,503 B1 * | 10/2002 | Karau et al. | 379/221.13 |
| 6,574,608 B1 | 6/2003 | Dahod | 705/26 |
| 6,598,023 B1 * | 7/2003 | Drummond et al. | 705/1 |
| 6,598,026 B1 | 7/2003 | Ojha et al. | 705/26 |
| 6,601,234 B1 * | 7/2003 | Bowman-Amuah | 717/108 |
| 6,657,702 B1 * | 12/2003 | Chui et al. | 355/40 |
| 6,674,453 B1 * | 1/2004 | Schilit et al. | 715/810 |
| 6,853,989 B2 * | 2/2005 | Allport et al. | 705/401 |
| 2002/0157022 A1 * | 10/2002 | Katada et al. | 713/201 |
| 2004/0257610 A1 * | 12/2004 | Itoh et al. | 358/1.15 |

FOREIGN PATENT DOCUMENTS

| | | | | |
|---|---|---|---|---|
| GB | 2312594 A | * | 10/1997 | H04Q 3/00 |
| GB | 2334176 | | 8/1999 | |
| JP | 10-320321 | | 12/1998 | |
| JP | 2002215918 A | * | 8/2002 | G06F 17/60 |
| WO | WO 98/20698 | | 5/1998 | |
| WO | WO 99/41899 | * | 8/1999 | H04M 15/00 |
| WO | WO 2002/008871 A3 | * | 1/2002 | G06F 1/00 |

OTHER PUBLICATIONS

Derwent-Acc-No.: 1997-492642, Oct. 1997, Direct signalling telecommunication system—has separate call servers, invoking call service providers to subscriber . . . , see the advantage.*

Derwent Acc. No. 1999-086425 (Dialog database printout corresponding to JP 10-320321).

Derwent Acc. No. 1999-397565 (Dialog database printout corresponding to GB 2,334,176 and Patent 6,430,178).

Derwent Acc. No. 2000-072115 (Dialog database printout corresponding to WO 99/41899).

Derwent Acc. No. 2000-349479 (Dialog database printout corresponding to Pat nt 6,055,512).

* cited by examiner

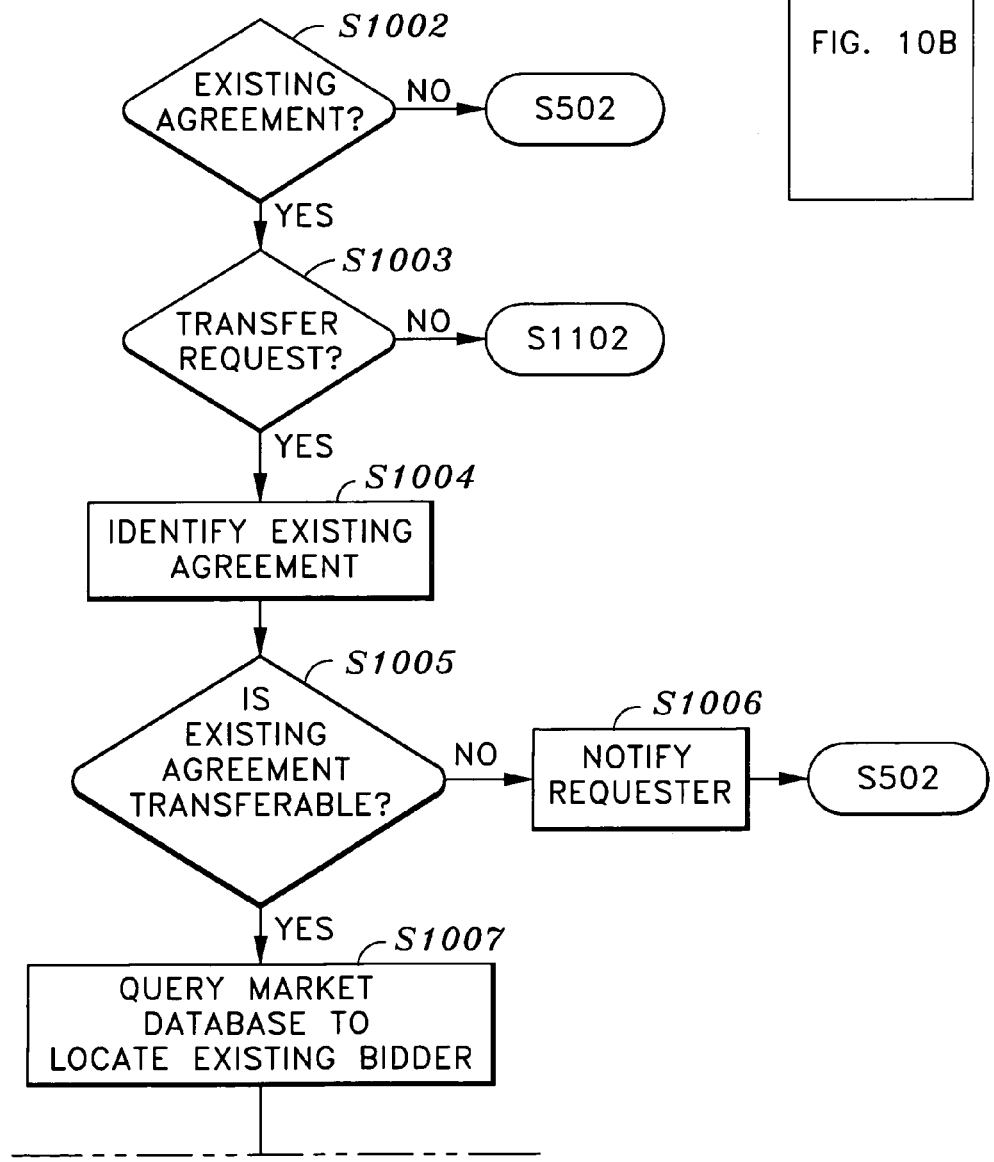

VIRTUAL PRINT MARKET PLACE

BACKGROUND OF THE INVENTION

1. Field of the Invention

The present invention concerns creating a virtual print market place for providing print services, such as photo print services, over a computer network. More particularly, the present invention relates to the creation of a virtual print market place wherein service providers are selected to provide print services to interactive sites, or shops, based on criteria established by the interactive shops as well as market information.

2. Description of the Related Art

In a traditional photographic processing arrangement, a roll of exposed film is dropped off at a photo shop or other retail outlet along with an order designating the desired number and type of prints. The photo shop forwards the film and order to a film processor where the prints are generated along with a set of negatives which are returned to the photo shop where they are picked up by the buyer.

More recently, a buyer may opt to have digital images created from the exposed film so that the images may be loaded onto a computer system. In addition, it is possible to take a picture using a digital camera that captures the image in a digital format that may be uploaded to a computer system. A hard copy image such as a picture may also be scanned to capture a digital image of the picture which may be stored on a computer system. Regardless of the manner in which a digital image is created, once stored on a computer system, the digital image may be displayed and manipulated using software resident on the system (i.e., Adobe Photo Shop).

It is also possible to generate a print out of the digital image using a black and white or color printer connected to the computer system. However, printers cannot provide the same quality as that provided by a film processor. It is therefore still beneficial to be able to order a photographic quality hard copy (e.g., photographic prints). Since the digital images are stored on the computer, it would be beneficial to be able to select the digital images and place an order such that both the order and the digital image are sent via a computer network to the film processor or other processing entity. In so doing, it would be possible to obtain a print or other hard copy (e.g., mugs, T-shirts, photos, etc.) that is of higher quality than printer output or otherwise cannot be generated using a printer.

One such scheme is described in U.S. Pat. No. 6,017,157, assigned to PictureVision, Inc., which provides a method for distributing digital prints produced from digital images. An image server stores digital images and related information. An authorized user may access the digital image to order a print from the developer or fulfillment center associated with the digital image. The developer or fulfillment center maintains control over the products ordered from the digital images by completing a price sheet identifying the products to offer and the prices for the products. Initially, an upload interface is used to upload digital images from a photographer or a film developer. Where a photographer uploads the digital images, the photographer selects one of the fulfillment centers to fulfill all orders placed using the images uploaded by the photographer. Anyone authorized to access a digital image may place an order using an order interface that consists of the price sheet of the developer or fulfillment center associated with the digital image.

A problem with this approach is that it is designed to allow the film developer and fulfillment center to retain control over the products offered for the digital images produced from rolls of film submitted to them and the prices of these products. That is, the products and services provided by the image server are controlled by and determined as a result of the digital images that are uploaded to the image server as well as the film developer or fulfillment center. Thus, it is not possible, for example, for the image server to ensure that a certain level or type of product and/or service is provided with respect to digital images that are stored on the image server.

With the advent of the Internet, also referred to as the World Wide Web or Web, various Web sites provide the ability to upload digital images to an image server and to order prints of the uploaded digital images. Traditionally-established business relationships or alliances between photo print vendors and Web image servers allow the image servers to offer photo print products and services provided by the photo print vendor. A disadvantage of this approach is that the image server site relies on these traditionally-established business relationships. It is not possible for the image server or the photo print vendors to form or modify these business relationships dynamically or interactively.

A computerized quotation system is described in U.S. Pat. No. 5,758,328 issued to Giovannoli wherein a potential buyer of a product or service generates a request for quotation ("RFQ") which is forwarded to a centralized quotation system. Under the system architecture described, there is no centralized product/service database. Rather, each vendor maintains its own product/service database and the quotation system forwards the RFQ to potential vendors. The vendors respond by supplying quotations that are forwarded to the buyer. The buyer uses the forwarded quotations to select a vendor from whom the buyer purchases the product or service. The buyer, quotation system and vendor may each set filter conditions that are used to determine which of the vendors receive an RFQ and which of the quotations supplied by the vendor are forwarded to the buyer. Using this approach, the buyer determines which vendor is to be selected from those vendors whose quotations were forwarded to the buyer by the quotation system. There is no mechanism provided that would allow an image server to control vendor selection and/or the product or service that is to be provided by a given vendor.

Accordingly, what is needed is an ability to dynamically create a relationship between image servers and print product suppliers which allows the image server to maintain control over the photo print products and/or services that it offers to its users (e.g., photographer or others who upload images to the image server), and to allow these relationships to be transferred such that the print products and/or services may be provided by other suppliers to other image servers.

SUMMARY OF THE INVENTION

The present invention addresses the foregoing by providing a method performed using one or more interconnected computer systems to create a virtual print market place wherein market information is collected. The market information including an identity of service providers and the services (e.g., print services) and pricing provided by each of the service providers, criteria established by the interactive shop is used to select service providers identified in the market information to provide a set of print services offered to patrons of the interactive shops.

As a result, dynamic relationships may be formed interactively between interactive shops and service providers to provide print services offered to patrons of the interactive shops. Further, the interactive shops have the ability to maintain control over the print services provided and the service providers that provide the print services. Examples of services include, for example, generating digital, and/or, print output from input such as digital data and/or images as selected by a patron of the interactive shop. Examples of such output include, but are not limited to, print or photographic quality output using a media provided by a service provider including paper (photographic quality or otherwise), transparencies, mugs, T-shirts, posters, etc. An output product may also be in the form of digital output representing, for example, presentation visuals for use with presentation software. In addition to these examples of services, a service provider may further provide products such as picture frames or packaging materials as well as other services.

In another aspect, the present invention is a method, using one or more interconnected computer systems, of creating a virtual print market place wherein market information is collected that includes an identity of service providers, interactive shops, a standardized set of print services and pricing provided by each of the service providers, a supply bid is obtained from a service provider identifying a print service and terms for providing the print service, a purchase bid is further obtained from an interactive shop identifying the print service and terms for purchasing the print service and a relationship is established between the service provider and the interactive shop when the terms of the print service and the interactive shop are compatible wherein the service provider agrees to provide and the interactive shop agrees to purchase the print service according to the terms.

The foregoing aspect provides a market place wherein relationships may be dynamically formed between service providers and interactive shops for the supply and purchase (respectively) of print services. These relationships may then be modified to form new relationships between different interactive shops and/or service providers.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
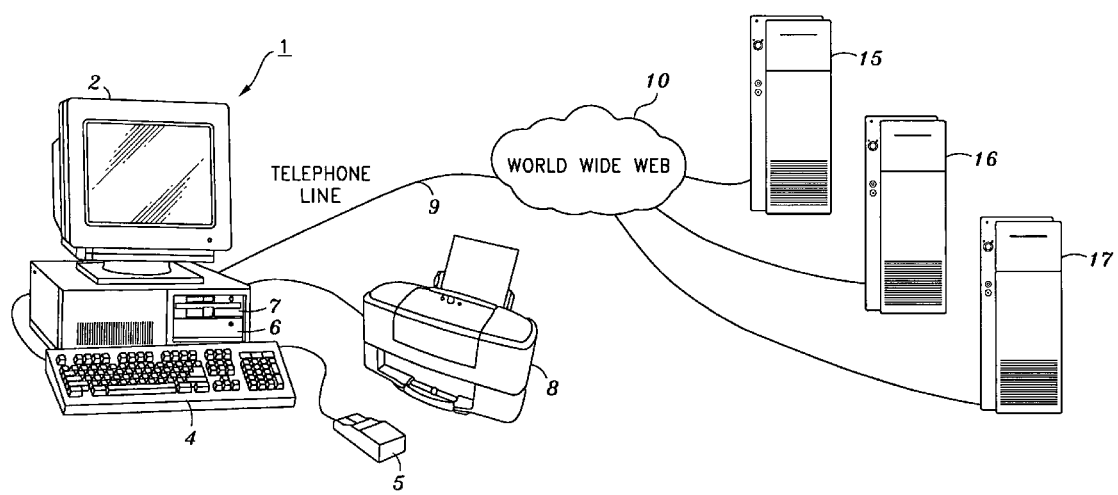
FIG. 1 is an outward view of a hardware environment embodying the present invention.

FIG. 1 is an outward view of representative computing hardware embodying the present invention. Shown in FIG. 1 are computer 1 executing a browser-enabled operating system, such as Microsoft Windows98®, display monitor 2 for displaying text and images to a user, keyboard 4 for entering text and commands into computer 1, and mouse 5 for manipulating and for selecting objects displayed on display monitor 2. Also included with computer 1 are fixed disk drive 6, in which are stored application programs, such as a World Wide Web browser application, data files, and device drivers for controlling peripheral devices attached to computer 1, floppy disk drive 7 for use in reading data from and writing data to floppy disks inserted therein. Data and/or applications may also be accessed from a CD-ROM via a CD-ROM drive (not shown) or over a network to which computer 1 may be connected (network connection not shown). Printer 8 is used to output hard copy images under control of an application program and device drivers executing on computer 1, and may be an ink jet printer, a laser beam printer or the like.

Computer 1 further includes a serial modem (not shown) connected to telephone line 9 which, in turn, is connected to World Wide Web 10. It should be noted that computer 1 may be connected to World Wide Web 10 by other types of connections. By executing a web browser application, web pages and associated data can be received from World Wide Web 10 over telephone line 9 for display on monitor 2.

Also connected to World Wide Web 10 is web server 15, which receives requests for web pages from such web browsers and sends the pages to a requesting browser over World Wide Web 10. As is described in more detail below, web server 15 includes program code configured to receive requests for web pages and send pages to the requesting browser to assist a user of computer 1 to upload digital data (e.g., digital images) to web server 15 and/or purchase output generated from the uploaded digital data in an interactive shop.

Web server 15 preferably further includes a browser application for connecting to web server 16 via World Wide Web 10. Web server 16, as described below, preferably includes a database of market place information. Using web server 16, web server 15 can access and update database information located on server 16. Web server 16 includes program code configured to provide a market portal or gateway such that an interactive shop application that executes on web server 15 can order products and/or services from service provider software that executes on web server 17. Web server 17 preferably includes a browser application for connecting to web server 16 via the World Wide Web 10.

Like computer 1, web servers 15, 16 and 17 are computing systems that are preferably executing a browser-enabled operating system, such as Microsoft Windows98®, and may include a display monitor 2, keyboard 4 for entering text and commands and mouse 5 for manipulating and for selecting objects displayed on display monitor 2. Web server 15, 16 and 17 further include one or more disk drives (e.g., fixed disk drive 6, floppy disk drive 7 and/or a CD-ROM drive), in which are stored application programs, data files, and device drivers for controlling peripheral devices.

A floppy disk drive, such as floppy disk drive 7 may be used to read data from and write data to floppy disks inserted therein. Data and/or applications may also be accessed from a CD-ROM via a CD-ROM drive (not shown) or over a network to which web servers 15, 16 and 17 may be connected (network connection not shown). A printer (e.g., printer 8) may also be connected to one or more of web servers 15, 16 and 17 to output hard copy images under control of an application program and device drivers executing on the web server, and may be an ink jet printer, a laser beam printer or the like.

Web servers 15, 16 and 17 further include a serial modem or other interface (e.g., ethernet card) to connect to computing systems directly or, indirectly, via the World Wide Web or other communications network (e.g., local or wide area networks).

Figure 2:
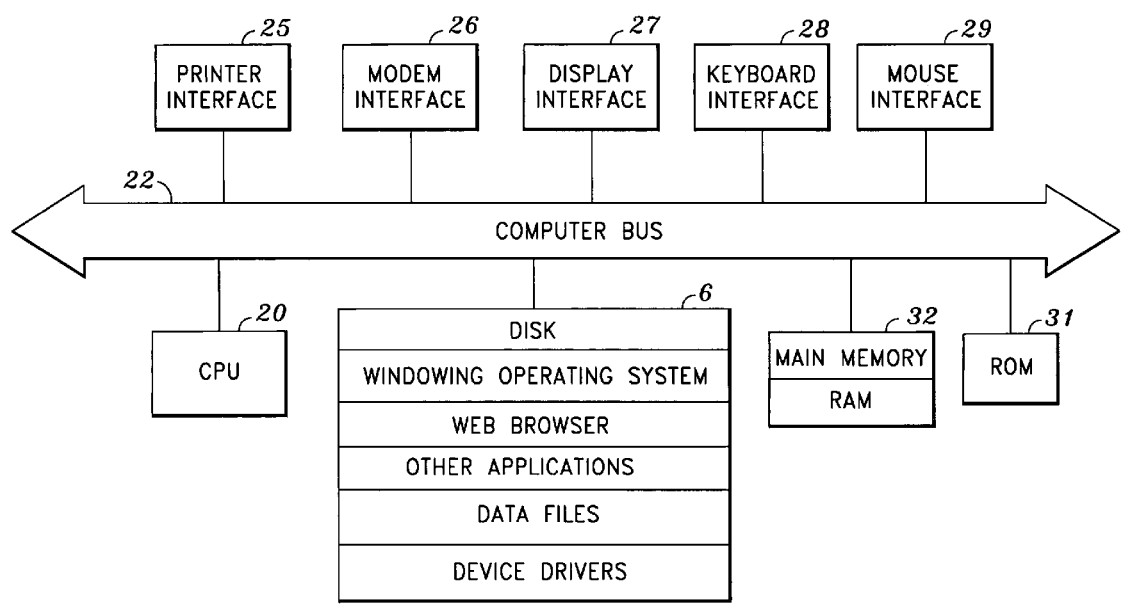
FIG. 2 is a block diagram of the internal architecture of a personal computer for use in conjunction with the present invention.

FIG. 2 is a block diagram of the internal architecture of computer 1. Shown in FIG. 2 are CPU 20, which is preferably a Pentium-type microprocessor, interfaced to computer bus 22. Also interfaced to computer bus 22 are printer interface 25, to allow computer 1 to communicate with printer 8, modem interface 26 to enable communications between computer 1 and its internal modem, display interface 27 for interfacing with display monitor 2, keyboard interface 28 for interfacing with keyboard 4, and mouse interface 29 for interfacing with mouse 5. Of course, if computer 1 connects to World Wide Web 10 by a connection other than a telephone connection, a suitable interface other than modem interface 29 may be utilized.

Read only memory (ROM) 31 stores invariant computer-executable process steps for basic system functions such as basic I/O, start up, or reception of keystrokes from keyboard 4.

Main random access memory (RAM) 32 provides CPU 20 with memory storage which can be accessed quickly. In this regard, computer-executable process steps of a web browser or other application are transferred from disk 6 over computer bus 22 to RAM 32 and executed therefrom by CPU 20.

Also shown in FIG. 2 is disk 6 which, as described above, includes a windowing operating system, a web browser executable on the particular windowing operating system, other applications which may include word processing, spreadsheet, graphics, gaming applications as well as applications downloaded from World Wide Web 15 (e.g., an interactive shop interface application). Disk 6 further includes data files and device drivers as shown.

Aspects of the invention are described herein with reference to digital images used to generate photographic output using photo print services provided by a photo service provider. However, it should be apparent that any type of data and/or digital data may be used (including, but not limited to, digital image data) as input to generate an output product. Further, it should be apparent that any type of output product may be provided using aspects of the present invention. Thus, while the invention is described with reference to print output, and in particular to photo print output, it should be apparent that other forms of output, including rendered or print image output, may be generated by a service provider from the input provided to the service provider.

Figure 3:
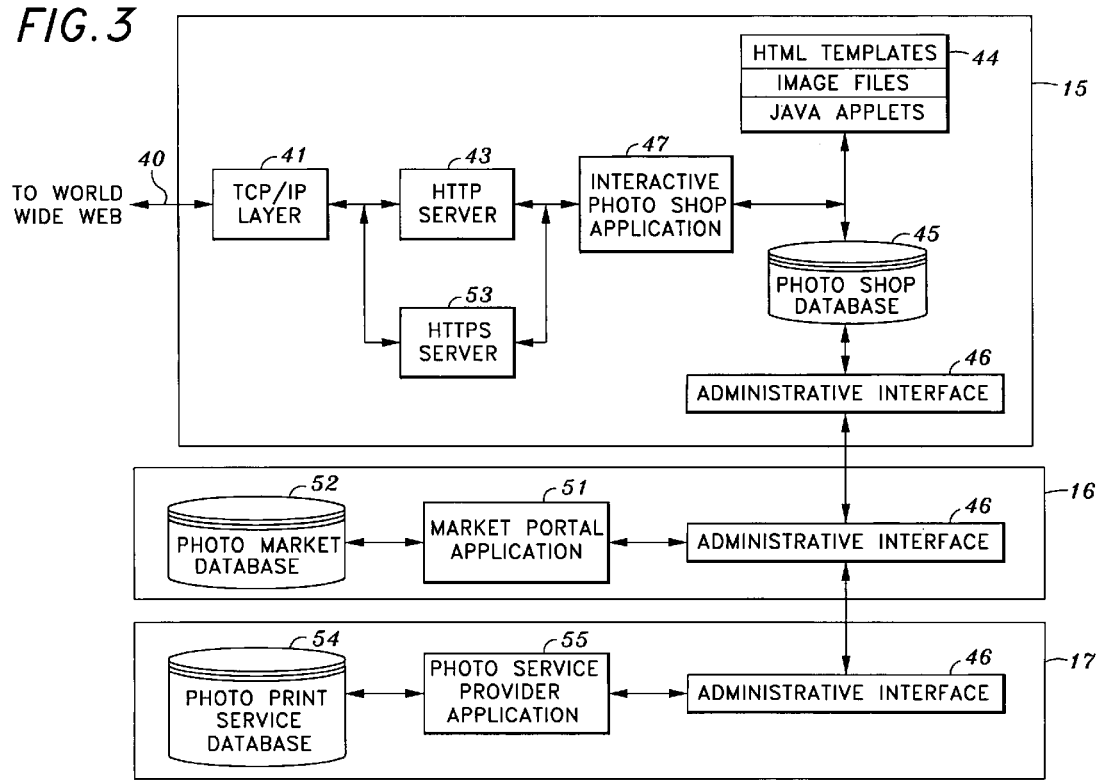
FIG. 3 is a block diagram of relevant internal architecture of computer servers used in conjunction with the present invention.

FIG. 3 is a block diagram of several relevant components internal to web servers 15, 16 and 16. As shown, web server 15 is connected to World Wide Web 10 via World Wide Web connection 40, which may be a telephone line, a T1 line, a local area network connection or the like. In a case that World Wide Web connection 40 connects directly to a local area network, the local area network is preferably connected to a router (not shown), which, in turn, is connected to World Wide Web 10. In such a configuration, the router includes firewall software for prevention of unauthorized access to the local area network.

Data packets received over World Wide Web 10 (IP packets) travel over connection 40 to TCP/IP layer 41 wherein the TCP portion of the packet is removed and an HTTP or, in a case of a secure (e.g., encrypted) packet, an HTTPS packet is forwarded to HTTP server 43 or HTTPS server 53, respectively. HTTP server 43 or HTTPS server 53 forwards requests contained in the packet that are directed to an interactive shop application such as interactive photo shop application 47.

Interactive photo shop application 47 processes requests received from HTTP server 43 and HTTPS server 53 and constructs web pages from HTML templates and image files stored in file storage 44 in response. A response may be forwarded to a requester via HTTP Server 43 or HTTPS server 53, TCP/IP Layer 41 and World Wide Web 10. File storage 44 may further include Java applets, which are programs executable by a Java Virtual Machine contained in a browser application. These Java applets can also be sent over World Wide Web connection 40 to a requesting browser application to provide additional browser functionality. Interactive photo shop application 47 may also extract information from a database such as photo shop database 45 to construct web pages. Preferably, photo shop database 45 includes photo shop information such as information regarding a patron of the interactive photo shop, uploaded digital images and the like.

Web server 15 further includes administrative interface 46 comprising a programming interface having functions and other program code for interfacing with market portal application 51 executing on web server 16. In a case that administrative interface 46 interfaces with market portal application 51 over World Wide Web 10, web server 16 includes TCP/IP Layer 41 and either or both of HTTP server 43 and HTTPS Server 44 as well as file storage 44 functioning much the same as described above with respect to web server 15. As is discussed more fully below, using administrative interface 46, web server 15 can transmit selection criteria for selecting photo service providers and placing photo service bids, place an order for photo print services, etc. to web server 16.

Market portal application 51 executing on web server 16 receives and processes requests from interactive photo shop application 47 via administrative interface 46 over World Wide Web 10 as previously described. In addition, market portal application 51 receives and processes requests from a service provider application such as photo service provider application 55 executing on web server 17 via administrative interface 46. As is discussed in more detail below, such requests may include registration, metrics, bid, and selection criteria requests. A print service database such as photo print service database 54 is accessed by photo service provider application 55 and stores, among other things, product and pricing information which is preferably forwarded to market portal application 51 via administrative interface 46.

A market portal (e.g., web server 16) is configured to establish a dynamic relationship or agreement that may replace or augment a traditional business relationship. Such a relationship is formed between interactive photo shop (e.g., web server 15) and a photo service provider (e.g., web server 17) such that the photo service provider is able to provide photo print services in response to orders placed by patrons of the interactive photo shop. Such relationships may be established between any of the interactive photo shops and photo service providers that are registered or otherwise authorized to participate in the market portal. An interactive photo shop may order photo prints from more than one photo service provider (e.g., 3×5 prints from one photo service provider and 4×6 prints from another). Similarly, a photo service provider may supply prints to one or more interactive photo shops.

Figure 4:
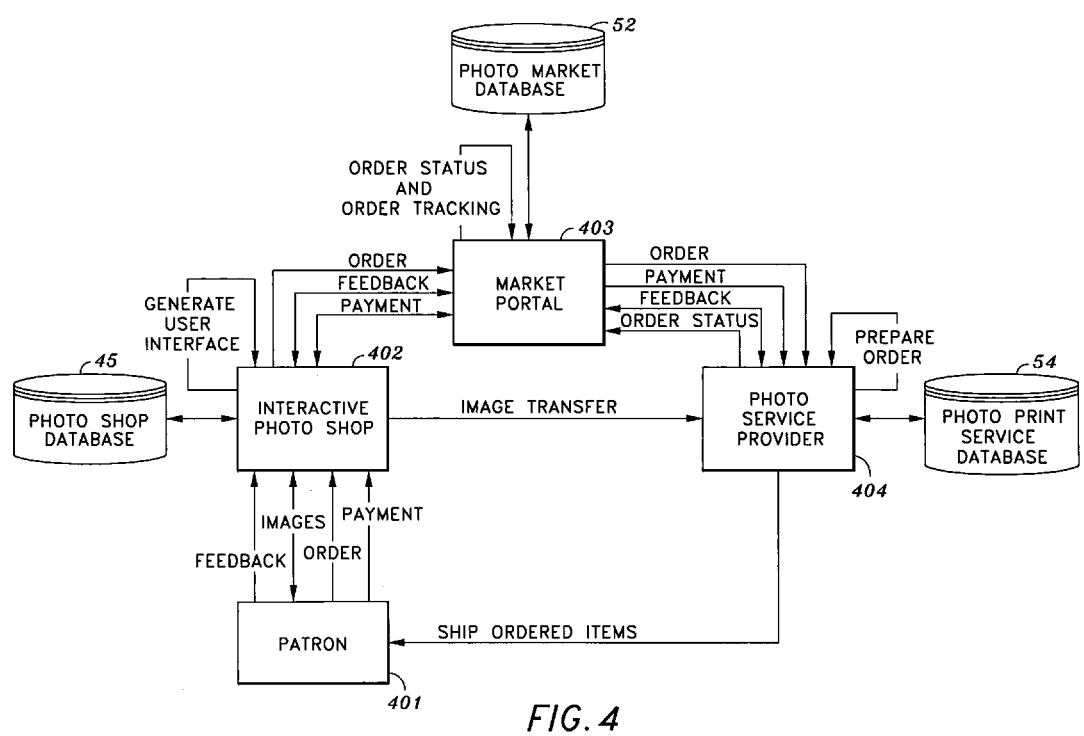
FIG. 4 is an overview of an order flow involving a market portal, interactive photo shop, and photo service provider according to the present invention.

FIG. 4 is an overview of an order flow involving a market portal, interactive photo shop, and photo service provider. The order flow depicted in FIG. 4 is preferably undertaken such that information flows between an interactive shop such as interactive photo shop 402, market portal 403 and a service provider such as photo service provider 404 using World Wide Web 10 and administrative interface 46.

Initially, patron 401 transfers one or more digital images to interactive photo shop 402 which are stored in photo shop database 45. Patron 401 may be a photographer, film developer, etc. Interactive photo shop 402 provides an interface comprising web pages that allow an authorized patron 401 to order a photo or other hard copy product (e.g., T-shirt, mug, poster, etc.) of the digital image. In addition, patron 401 provides payment information. Payment may be accomplished using any payment scheme (e.g., credit, debit, or smart cards, electronic money, etc.).

Interactive photo shop 402 forwards the order to market portal 403 and market portal 403 identifies photo service provider 404 to fill the order. Photo service provider 404 has either been previously selected, or is selected after the order is received, using criteria established and communicated by interactive photo shop 402. That is, using the selection criteria, market portal 403 selects photo service provider 404 based on the information contained in a market database such as photo market database 52.

Market portal 403 forwards the order to photo service provider 404. The order identifies the items ordered and further provides information to allow photo service provider 404 to retrieve the digital image(s) to be used with the ordered items. For example, the order may include a Uniform Resource Locator (URL) that identifies the file that contains the digital image and the location of the file (e.g., photo shop database 45). Photo service provider 404 generates a request for the digital image(s) that is directed to interactive photo shop 402. Preferably, the request is not sent by way of market portal 403. This reduces the traffic that flows through market portal.

Photo service provider 404 uses the received digital image(s) to prepare the requested items. Photo service provider 404 sends order status information to market portal 403 and ships the completed items to patron 401. Once the ordered items are shipped, photo service provider 404 sends a "completion" status to market portal 403.

Upon receipt of the "completion" status, market portal 403 distributes payment or causes payment to be distributed using any of a number of payment scenarios. For example, in one payment scenario in addition to paying photo service provider 404, interactive photo shop 402 receives a payment (e.g., a commission or royalty) as well as market portal 403 (e.g., a service fee). In another scenario, interactive photo shop 402 subsidizes patron 401's payment. In this case, payment received from interactive photo shop 402 and patron 401 might be distributed between photo service provider 404 and market portal 403.

Objective and/or subjective feedback regarding the order process may be provided by and supplied to the participants. For example, patron 401 may provide feedback that identifies the level of satisfaction with photo service provider 404 (e.g., the quality of the delivered service and/or products) and interactive photo shop 402. Market portal 403 may provide (with or without a charge) feedback to either interactive photo shop 402 and photo service provider 404. In addition, as each order passes through market portal 403, it is able to provide metrics such as number and price of ordered items as well as which interactive photo shop 402 and photo service entity 404 were involved in each order. Interactive photo shop 402 may use this feedback to redefine its selection criteria, for example, to obtain better priced, and/or better quality, products. Photo service provider may use the feedback to redefine its products and/or pricing structure.

Figure 5:
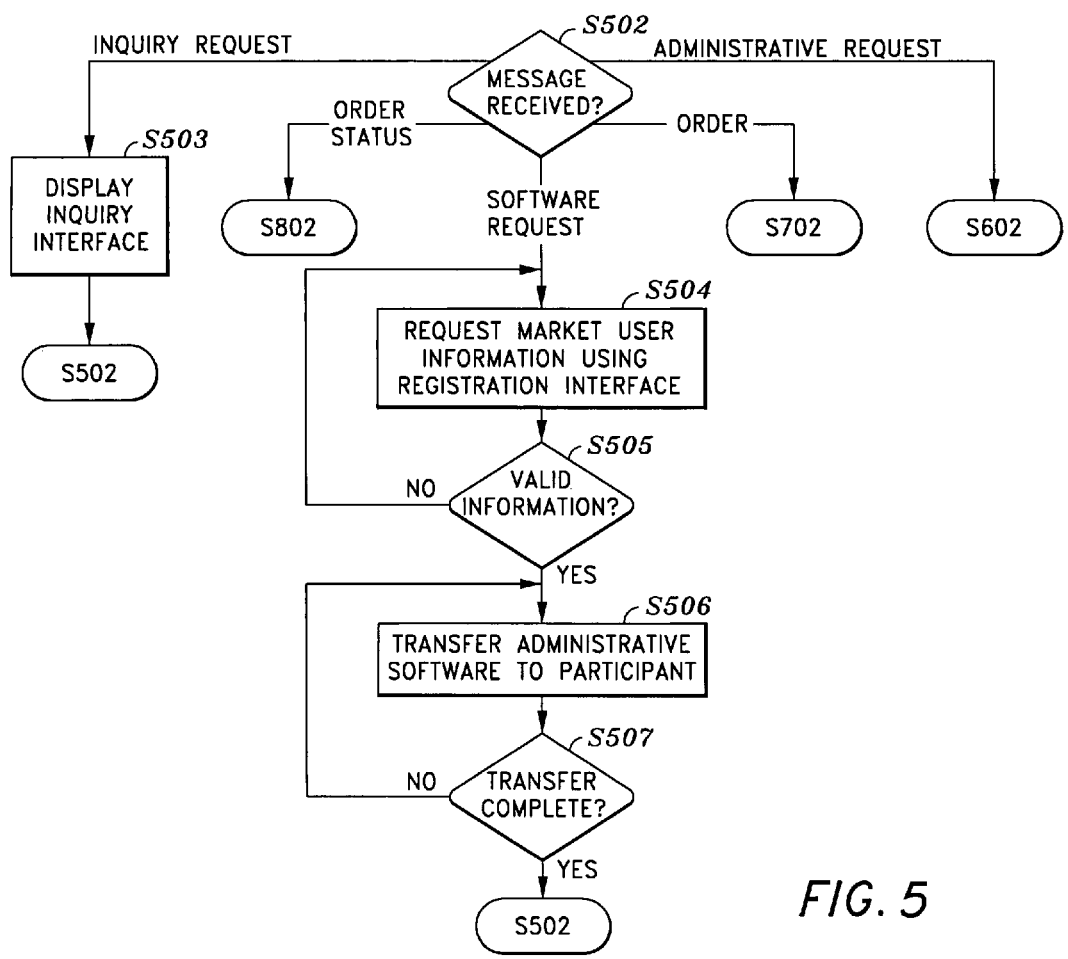
FIG. 5 illustrates a flow diagram of process steps to respond to such requests received by market portal 403 according to the present invention.

Market portal 403 receives messages in addition to those containing order requests. FIG. 5 illustrates a flow diagram of process steps to respond to such requests received by market portal 403. At S502, a determination is made whether a message is received by market portal 403 and the type of message that is received. For example, market portal 403 is configured to respond to inquiries by a potential market participant. In such a case, market portal 403 responds at S503 with one or more web pages containing information about the market portal that may include terms of participation and the process for becoming a participant (e.g., process for downloading administrative interface 46 and registration).

In a case that market portal 403 receives a request from a current or perspective participant for software, market portal 403 may first request information from the participant at S504 using a registration interface, for example. Such information may include the participant's name, address, email address, URL, phone number, name and number of a contact in the case that the participant is a company, for example.

The information received at S504 is then validated. This process may entail performing data validation checks and/or ensuring that the participant has agreed to the terms of participation, for example. If the information provided is determined to be valid at S505, at S506, the requested software (e.g., administrative interface 46) is transferred to the participant. The transfer process may take place using World Wide Web 10, for example. A determination is made whether or not the transfer has completed successfully at S507, and response processing continues at S502 to process another message received by market portal 403.

Figure 8:
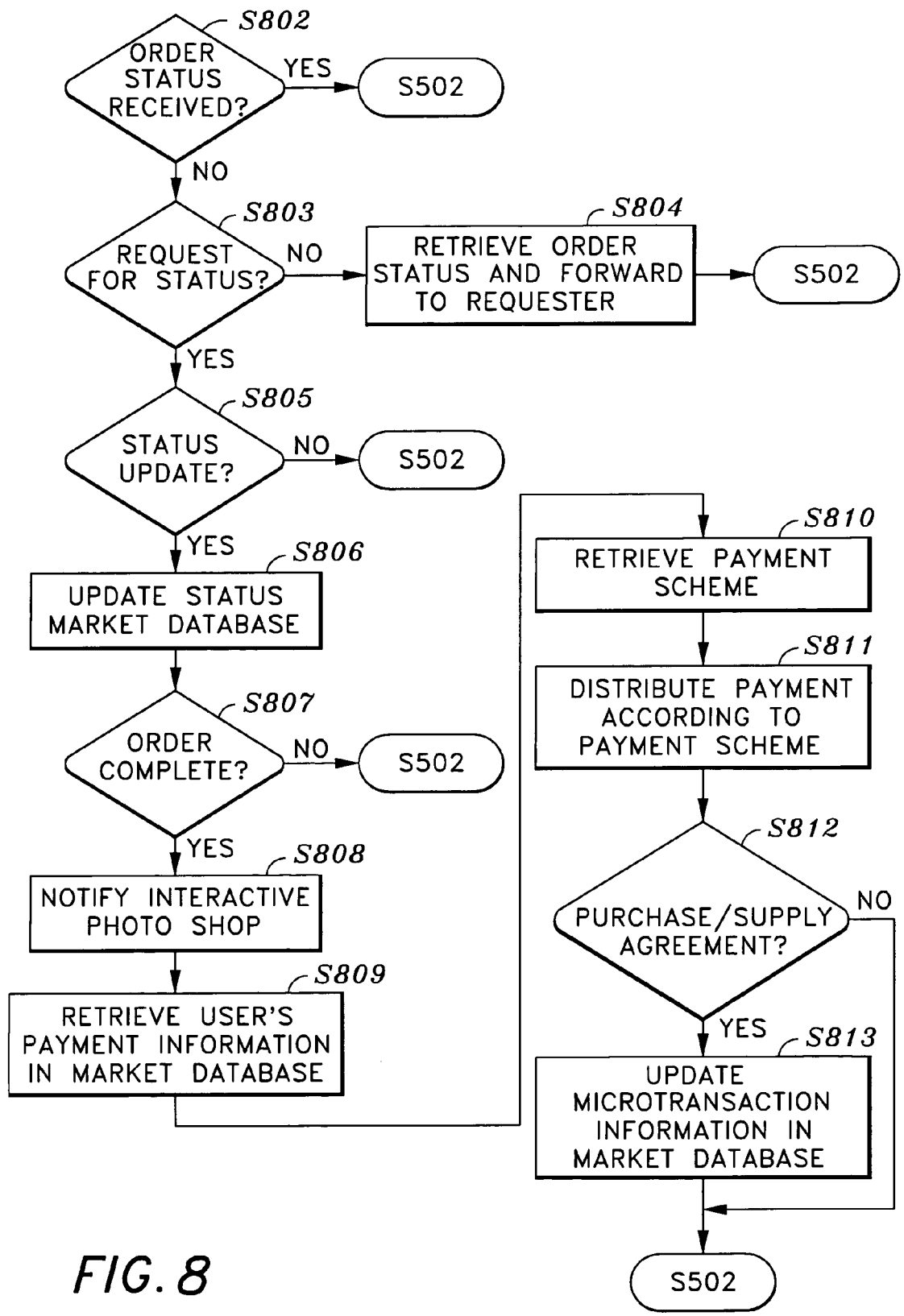
FIG. 8 provides a flow diagram of process steps to respond to an order status message according to the present invention.

Another type of message that may be received is an order status message. Where it is determined at S502 that the message is an order status message, market portal 403 proceeds to process the message as described in FIG. 8 which provides a flow diagram of process steps to respond to an order status message according to the present invention. If it is determined, at S802, that the message is not an order status message, processing continues at S502 to process this or another received message. If, however, it is determined that the message is an order status message, the order status message may be a request for status or an update of an order's status. Thus, at S804 a determination is made whether the order status message is a status request or status update. If it is determined that the message is a status request, the order's status is retrieved from photo market database 52 at S804 and forwarded to the requester.

Otherwise, a determination is made at S805 whether or not the order status message is a status update. If not, processing continues at S502 to process this or another received message. If the order status message is a status update, photo market database 52 is updated at S806. A determination is made, at S807 whether or not the order status message indicates completion of the order. If not, processing continues at S502. If the order status message indicates that an order is complete, the interactive photo shop is notified at S808, and the user's payment information and the payment scheme are retrieved from photo market database 52 at S809 and S810, respectively. At S811, payment is distributed or caused to be distributed according to the retrieved payment scheme.

An order may be placed pursuant to an agreement between interactive photo shop 402 to purchase and photo service provider 404 to supply a specified quantity of a product (or products). In such a case, market portal 403 tracks each order as a microtransaction of the overall transaction defined in the agreement. Thus, at S812, market portal 403 determines whether or not the order is a microtransaction. If not, processing continues at S502 to process other received messages. If the order is determined to be a microtransaction, market portal 403 updates photo market database 52 to reflect the microtransaction, and processing continues at S502 to await another message. For example, market portal 403 increments a number that reflects the quantity of the product in previous orders as well as the completed order's quantity.

Figure 7:
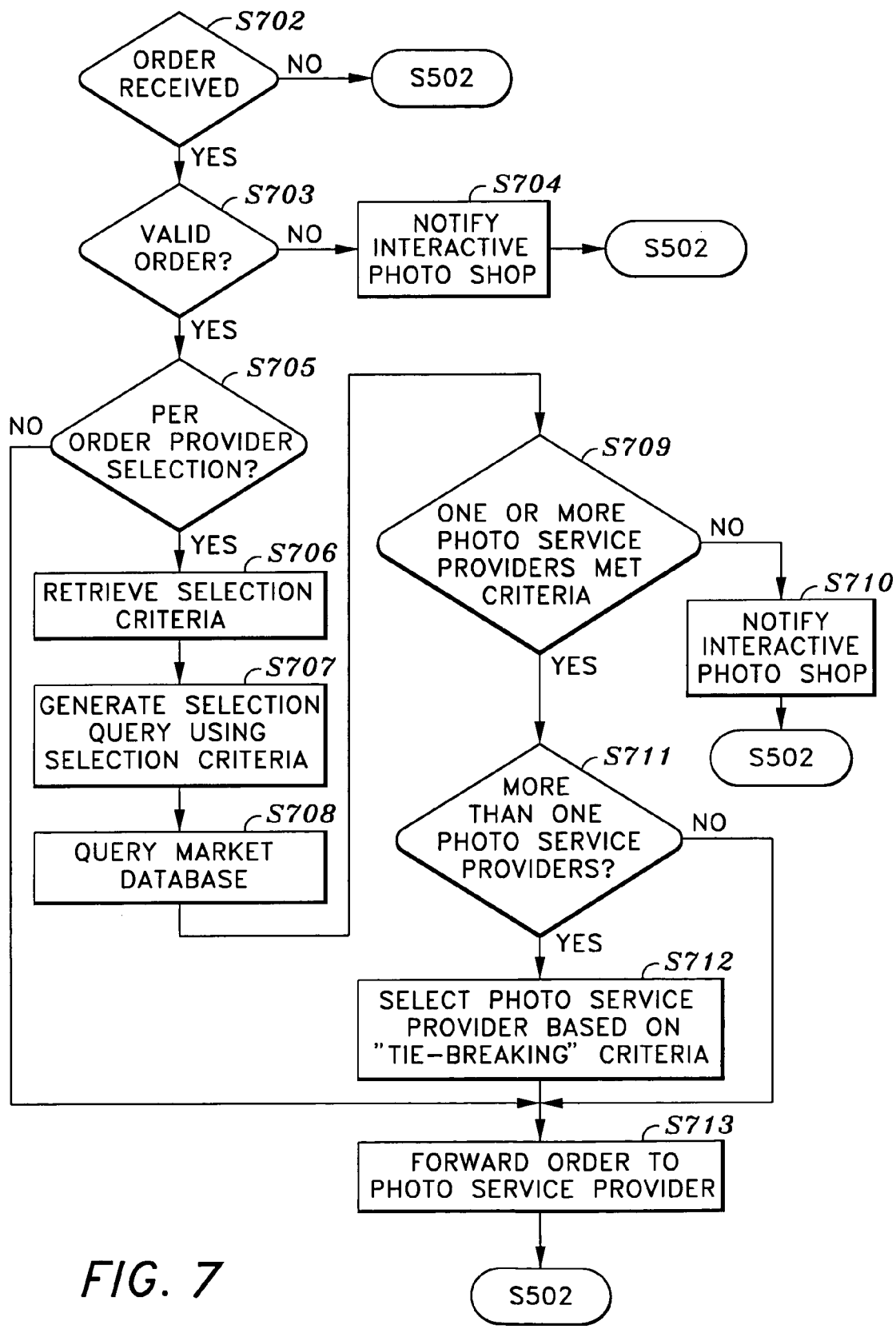
FIG. 7 provides a flow diagram of process steps to respond to an order message received by market portal 403 according to the present invention.

FIG. 7 provides a flow diagram of process steps to respond to an order message received by market portal 403. At S702, a determination is made whether the received message is an order message. If not, processing continues at S502 to process this or another received message. If it is determined that the message is an order message, processing continues at S703 to determine whether or not the order is valid (e.g., valid product designations and payment information). If not, a notification is sent to interactive photo shop 402 and processing continues at S502 to process another received message.

If it is determined at S703 that a valid message is received, processing continues at S705 to determine which photo service provider 404 is to receive the order. The photo service provider may be selected prior to the placement of the current order, prior to the placement of any order, or as each order is received by market portal 403. Thus, at S705, a determination is made whether the photo service provider selection is to be performed or to use a photo service provider previously selected using the selection criteria established by interactive photo shop 402. If it is determined to perform a selection, S706 to S712 (described below) are performed to select a photo service provider. Regardless of the outcome of the determination at S705, S713 is performed wherein the order is forwarded to at least one of the selected photo service providers 404.

Steps S706 to S712 are performed to select one or more photo service providers 404. At S706, the selection criteria established by interactive photo shop 402 is retrieved from photo market database 52. At S707, a query (or other retrieval request) is generated from the selection criteria. At S708, the photo service providers 404 that meet the selection criteria are identified using the information from photo market database 52. At S709, a determination is made whether any photo service providers 404 were identified. If not, a notification is sent to interactive photo shop 402. If so, processing continues at S711 to determine whether more than one photo service provider 404 was retrieved at S708. If so, one of the photo service providers 404 is selected based on criteria established by interactive photo shop 402 (i.e., "tie-breaking" criteria) to one of the photo service providers 404. For example, the photo service provider 404 offering the lowest price or being closest to interactive photo shop 402 and/or patron 401 may be selected over the other photo service providers 404. Preferably, market portal 403 updates the photo market database 52 to reflect the photo shop provider 404 identified in the selection process.

Figure 6:
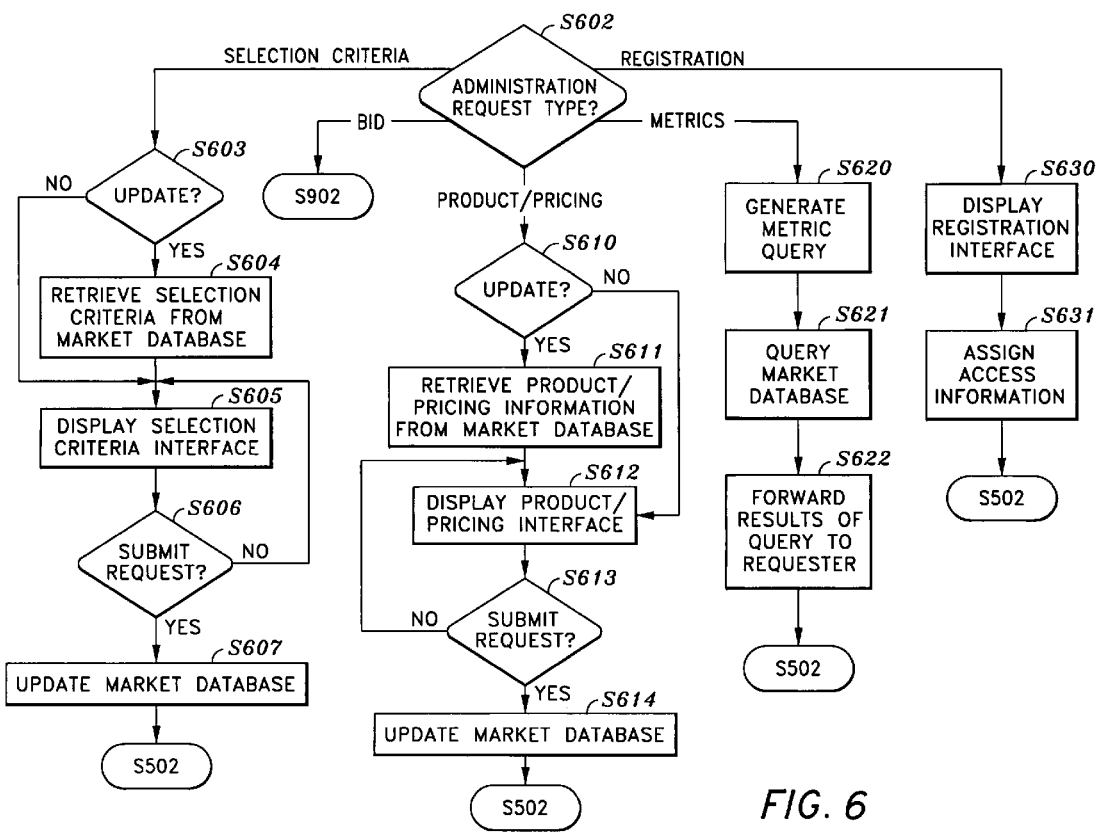
FIG. 6 is a flow diagram of process steps to respond to a selection criteria administrative request according to the present invention.

The selection criteria used in selecting photo service providers 404 is preferably sent to market portal 403 via administrative interface 46 in an administrative request. FIG. 6 is a flow diagram of process steps to respond to a selection criteria administrative request according to the present invention. The request may be to update existing selection criteria or to provide new selection criteria, for example. Thus, at S603, a determination is made whether or not the request is to update existing selection criteria. If so, the selection criteria that is to be updated for the requesting interactive photo shop 402 is retrieved from photo market database 52 at S604.

Regardless of whether new or updated selection criteria is being provided in the request at S605, a selection criteria interface (e.g., a web page) is displayed at S605 wherein the new/changed selection criteria may be viewed and selection information entered. Preferably, the selection criteria interface comprises a listing of categories of selection criteria and possible input. For example, the selection criteria interface may include price, quality, geographic location and shipping categories. Within the price category, there may be specific pricing alternatives or a more general selection (e.g., lowest price). The geographic category may provide options such as within a specific number of miles, or "closest" options, for example. Where the request is to update the selection criteria, the existing selection criteria is displayed in the selection criteria interface for editing, at S605.

At S606, a determination is made whether a submit request is entered in the selection criteria interface. If not, processing continues at step S605. If so, processing continues to retrieve the selection criteria from the selection criteria interface and update photo market database 52 at S607.

An administrative request may also be received by market portal 403 from photo service provider 404 to enter or update product and/or pricing information. Thus, if it is determined at S602 that such a request is received, a determination is made at S610 whether or not to retrieve existing data from photo market database 52. If so, the data is retrieved at S611. In either case, a product/pricing interface is displayed at S612. Preferably, a standardized product inventory is used and displayed in the product/pricing interface. Using the product/pricing interface, photo service provider 404 may enter pricing information for the desired products and then submit the information. If it is determined at S613 that a submit is received, processing continues at S614 to update photo market database 52 with the information entered by photo service provider 404 in the product/pricing interface.

As discussed above, information associated with activities (e.g., orders) that flow through market portal 403 may be accumulated and provided to participants (e.g., interactive photo shop 402, photo service provider 404 and/or patron 401) as a service (with or without an associated fee) provided by market portal 403. If it is determined at S602 that a request for such data is received, processing continues at S620 to generate a query to retrieve the requested information from photo market database 52. At S621, photo market database 52 is queried and the results are forwarded, at S622, to the requester or may be displayed in a metrics interface (e.g., one or more web pages).

Preferably, interactive photo shop 402 and photo service provider 404 register with market portal 403 prior to their participation. Thus, another administrative request that may be received by market portal 403 is a registration request. At S630, a registration interface is displayed wherein the requester enters information (e.g., name, address, email address, etc.). Access information (e.g., login and password) is assigned at S631.

Figure 9:
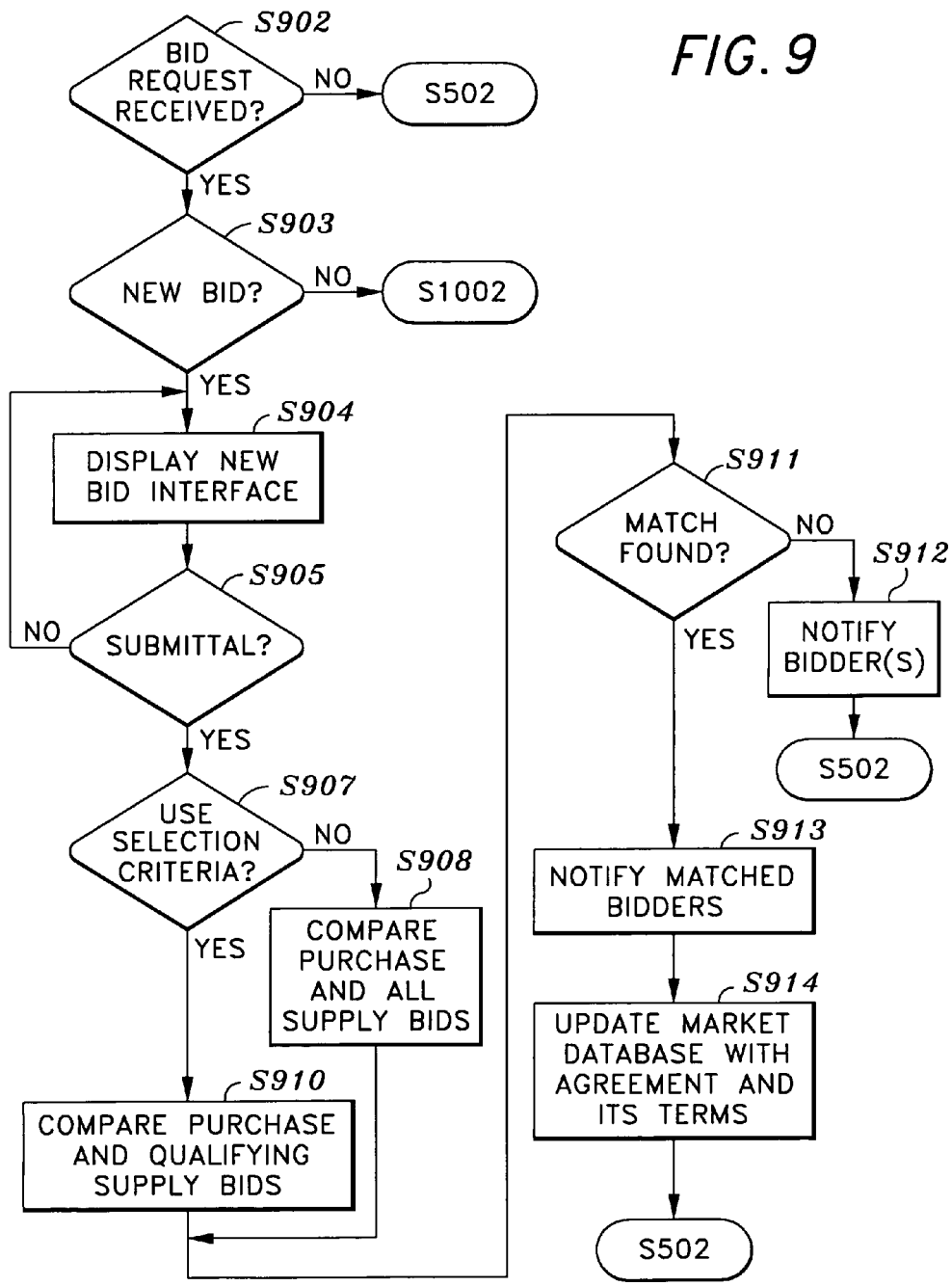
FIG. 9 is a flow diagram of process steps wherein participants may bid on all or a portion of new and existing agreements according to the present invention.
Figure 10B:
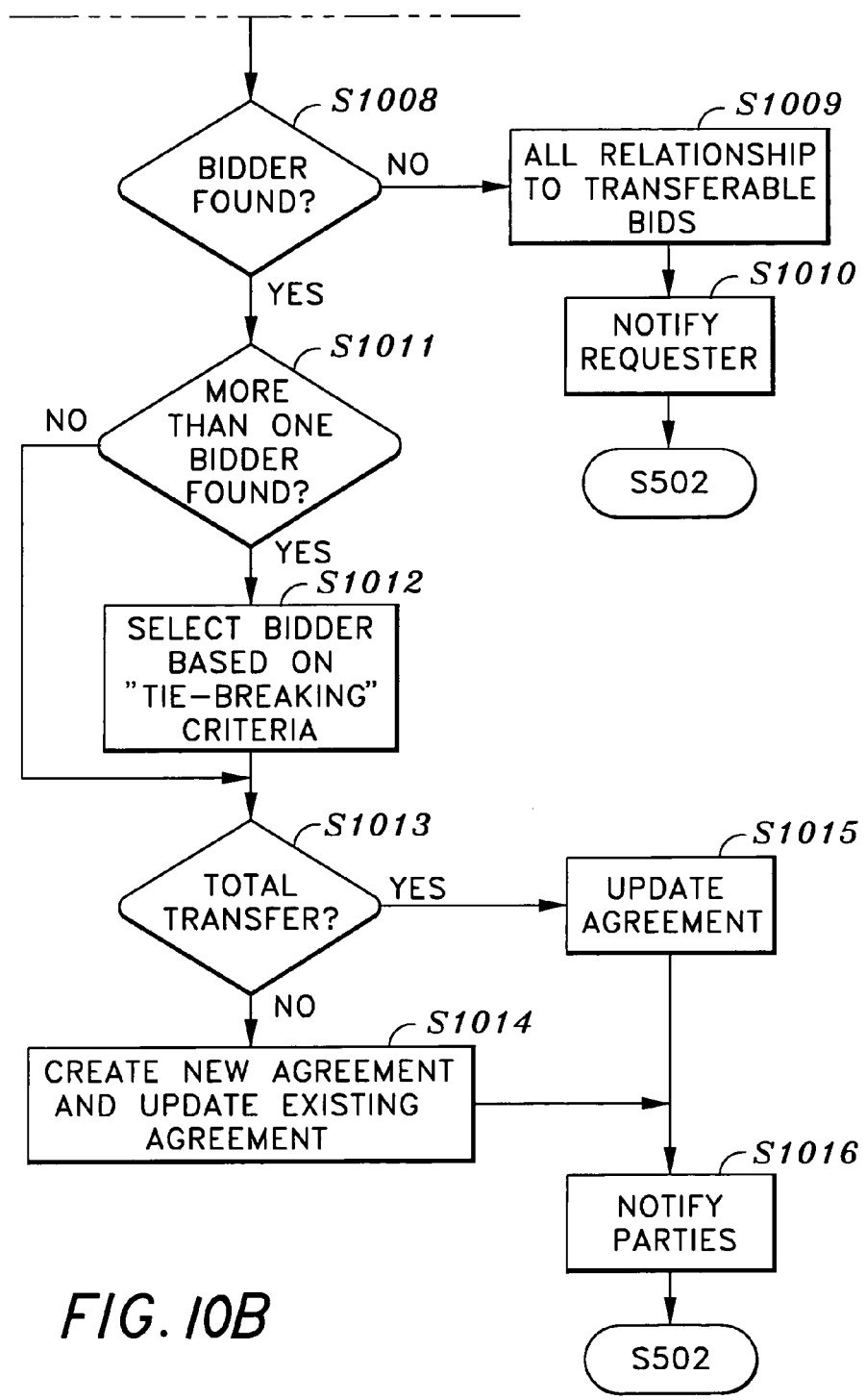
FIG. 10 is a flow diagram of process steps wherein participants may bid on all or a portion of new and existing agreements according to the present invention.
Figure 11:
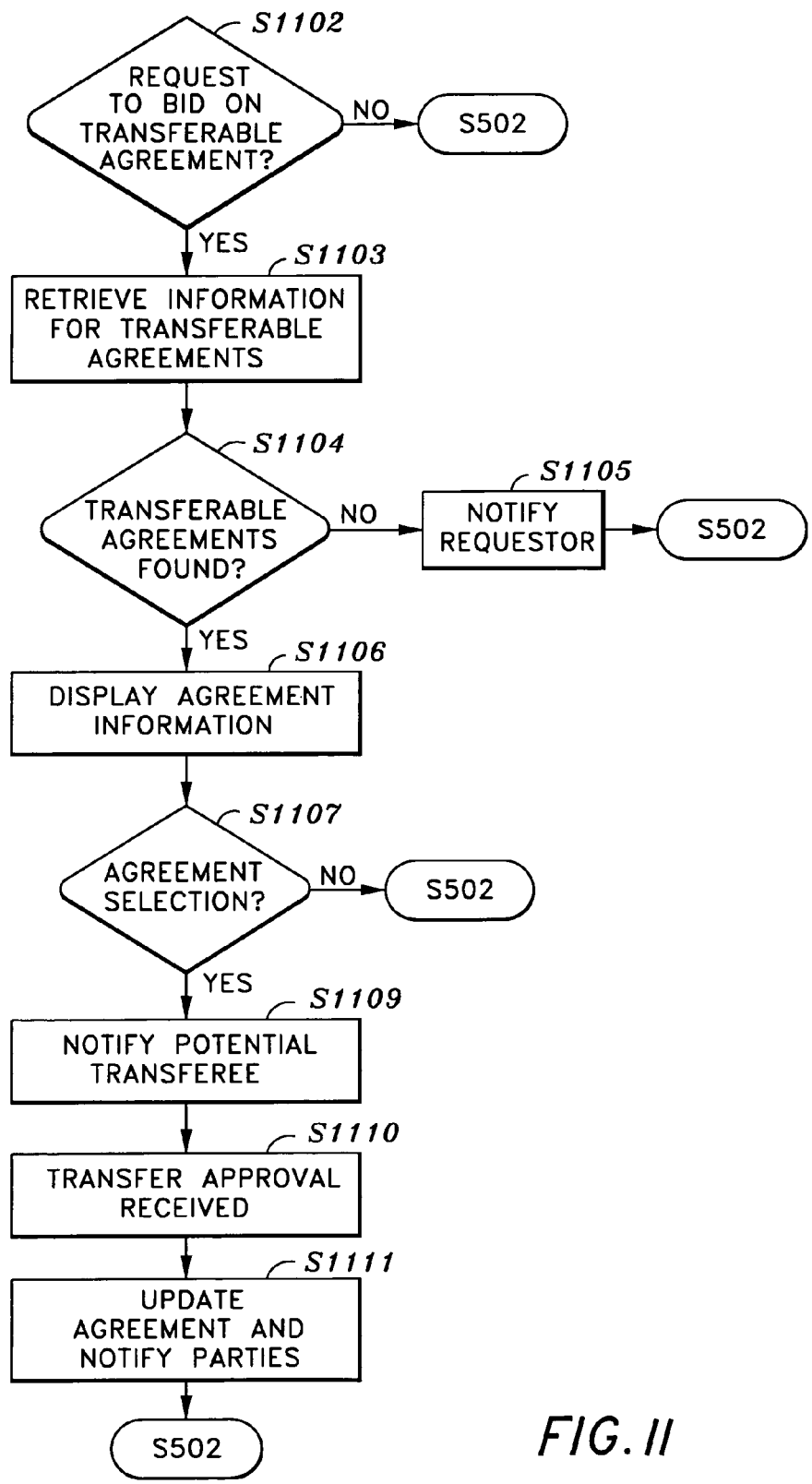
FIG. 11 is a flow diagram of process steps wherein participants may bid on all or a portion of new and existing agreements according to the present invention.

As discussed above, an order may be placed pursuant to an agreement between interactive photo shop 402 to purchase and photo service provider 404 to supply a quantity of a product. Using administrative interface 46, for example, market portal 403 facilitates formation of such an agreement using a bidding mechanism. That is, using the present invention, bids from interactive photo shops 402 may be matched with bids from photo service providers 404 to form a new agreement, or a bid may be made on an existing agreement to transfer (i.e., buy or sell) the existing agreement to another interactive photo shop 402 and/or photo service provider 404. FIGS. 9 to 11 are flow diagrams of process steps wherein participants may bid on all or a portion of new and existing agreements according to the present invention.

Referring to FIG. 9, a flow diagram of process steps wherein interactive photo shops 402 can place a bid to purchase a product (or products) and photo service providers 404 to supply a product (or products) where matching bids from interactive photo shop 402 and photo service provider 404 occur, a "purchase/supply" agreement is formed between the participants having the matching bids. Market portal 403 registers the agreement in photo market database 52. At S902, a determination is made whether or not a bid request is received. If not processing returns to S502 to process this or another message. At S903, a determination is made whether the bid request relates to a new or existing bid. If it is determined that the request is for an existing bid, processing continues at S1002 of FIG. 10 (described below) to respond to a request to transfer (e.g., to buy or sell) an existing purchase/supply agreement).

If, however, it is determined (at S903) that the request is a new bid, at S904, a new bid interface is displayed wherein a participant may enter bid information. For example, interactive photo shop 402 may identify the product (or products) that it wishes to purchase along with other terms (e.g., quantity and price information). Photo service provider 404 may use the new bid interface to enter product and term information (e.g., quantity and price information) for product (or products) that it wishes to supply. Once it is determined at S905 that a bid has been submitted, processing continues at S906 to initiate a matching operation on the current bids from the participating interactive photo shops 402 and photo service providers 404.

A bid may remain in the bidding process for a specified period of time that may be set by market portal 403 and/or by the bidding participants. If a match is not found, the bid may still be matched against other, subsequently received, bids for the life of the bid.

At S907, a determination is made whether or not to use selection criteria established by interactive photo shop 402 participants to eliminate those bids from photo service provider participants that do not satisfy the selection criteria. If not, processing continues at S908 to compare the interactive photo shops 402 bids with all of the photo service providers 404 bids. Otherwise, only those bids from photo service providers 404 that satisfy the selection criteria are used in the comparison at S910. The result of the comparison performed either at S908 or S910 are input to S911 wherein a determination is made whether or not a bid match exists. If not, the bidders may be notified at S912 and processing continues at S502 to process another message.

If a match is determined to exist at S911, processing continues at S913 to notify the participants with the matching bids. In a case where a match is found, the participants with the matching bids enter into a "purchase/supply" agreement wherein interactive photo shop 402 agrees to purchase and photo service provider 404 agrees to supply a product (or products) according to the specified terms (e.g., the terms identified in the new bid interface. At S914, photo market database 52 is updated to reflect this agreement.

An existing agreement may be transferred at the request of one of the parties to the agreement or as a result of an inquiry by another party. Using the bidding mechanism of the present invention, an existing agreement may be transferred from one of the original (or current parties) to another party. Thus, for example, a subsequent interactive photo shop 402 may replace the current interactive photo shop 402 such that the subsequent interactive photo shop 402 agrees to purchase an amount of the product (or products) remaining under the agreement. Similarly, a subsequent photo service provider 404 may agree to supply the amount of the product (or products) remaining under the agreement. If some number of the product has already been purchased/supplied at the time of the transfer, the remaining amount is the original amount minus the number purchased/supplied. It is further possible, using the present invention to transfer (e.g., buy or sell) the remaining agreement to more than one bidder.

Referring to S1002 of FIG. 10, a determination is made whether the bid request involves an existing agreement. If not, processing continues at S502 to process this or another message. If so, processing continues at S1003 to determine whether the bid request is a request to transfer from one of the parties to the agreement or a third party. If the transfer request is made by one other than a current party to the agreement, processing continues at S1102 of FIG. 11 to process the request as described below. If the request is made by one of the parties to the agreement, processing continues at S1004 to retrieve information about the agreement from photo market database 52. Using the retrieved information, a determination is made whether or not the agreement is transferable at S1005. The agreement may not be transferable if, for example, the parties so specified in the terms of the agreement.

If it is determined at S1005 that the agreement is non-transferable, the requesting party is notified at S1006 and processing continues at S502 to process another message. Otherwise, processing continues at S1007 to locate an existing bid, in photo market database 52, that matches the terms of the transferable agreement. That is, a determination is made whether or not there is an existing bid by a third party to purchase such an agreement. For example, where an interactive photo shop 402 that is a party to an agreement to purchase a product (or products) wishes to transfer the agreement, photo market database 52 is searched to find a suitable bid. Similarly, photo market database 52 may be searched to find a suitable bid from a photo service provided 404 in response to a request from a photo service provider 404 who is a party to an agreement. If a bidder is determined to not exist at S1008, processing continues at S1009 to retain the transfer request so that it may be matched against future bids.

Where it is determined (at S1008) that an existing bid matches the terms of the agreement, processing continues at S1011 to determine whether there is more than one bidder. If so, processing continues at S1012 to select one of the bids using the remaining party's "tie-breaking" criteria. For example, the "tie-breaking" criteria may specify that the highest bidder be selected.

As the transfer may be for less than the remaining quantity of product (e.g., the original amount lessened by the amount already purchased/supplied), a determination is made at S1013 whether or not this is the case. If so, the old agreement is partitioned into separate agreements at S1014 to reflect that there now exists an agreement between the remaining party and the new party and the old agreement is updated to exclude the transferred portion of the agreement. For example, the bid may be provided by an interactive photo shop 402 that agrees to purchase 50% of the remaining product quantity. In such a case, the old agreement is updated to reflect the transfer and the original interactive agreement is reduced to reflect the transfer.

Whether some or all of the agreement is being transferred, processing continues at S1015 to update the existing agreement and the parties are notified of the transfer at S1016.

The bidding mechanism of the present invention may be used to bid on an agreement where the parties to the agreement have not previously requested such a transfer (e.g., an unsolicited bid). Referring to S1102 of FIG. 11, a determination is made whether a request is such an unsolicited bid. If not, processing continues at S502 to process this or another request. If so, at S1103, information associated with transferable agreements is retrieved from photo market database 52. At S1104, a determination is made whether any such agreements were retrieved. If no transferable bids were located at S1103, the requester is notified at S1105 and processing continues at S502 to process another message.

If one or more transferable agreements were found, information about those agreements may be displayed at S1106 such that the requester may select one. If the requester chooses not to select one of the displayed agreements at S1107, processing continues at S502 to process another message. If the requester makes a selection, processing continues at S1109 to notify the existing parties and, where applicable, to obtain their approval of the transfer. At S1111, the agreement is updated in photo market database 52 to reflect the transfer and the parties are notified.

While the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method of creating, via a network, a print market place, in which a market portal gathers information from a service provider and an interactive shop to create a relationship between the service provider and the interactive shop, and the interactive shop offers products and/or services to its customers, the method comprising:

collecting, by the market portal, market information, comprising an identity of service providers and the print services and pricing provided by each of the service providers;

storing, by the market portal, the market information;

obtaining, by the market portal, criteria established by an interactive shop for selecting service providers to provide the print services, wherein the criteria is edited using a selection criteria interface which comprises a listing of a plurality of categories for selection of service providers and possible input; and selecting, by the market portal, one or more service providers identified using the market information to provide the set of print services based on the criteria and the market information;

wherein the interactive shop offers products and services to its customers via a graphical user interface by which a customer of the interactive shop orders products and services offered by the interactive shop; and wherein the print services and pricing information is collected and the selection criteria is obtained independent of an order by a customer.

2. A method according to claim 1, wherein the method further comprising:

forwarding an order for services placed in the interactive shop to at least one of the selected service providers via a market portal.

3. A method according to claim 2, further comprising:

transmitting digital data from the interactive shop to the at least one of the selected service providers via another communication channel that excludes the market portal.

4. A method according to claim 1, further comprising:

updating the market information to reflect amount, type and price of print services ordered in an interactive shop from a service provider.

5. A method according to claim 1, further comprising:

updating the market information to reflect level of satisfaction associated with a service provider.

6. A method according to claim 1 further comprising:

forwarding an order from the interactive shop to at least one of the selected service providers via a market portal;

transmitting a status of the order to the market portal; and rendering payment when the market portal determines that the ordered print services have been provided.

7. A method according to claim 6, the step of rendering payment further comprising:

collecting fees from a patron of the interactive shop that placed the order; and rendering payment to the one of the selected service providers from the collected fees.

8. A method according to claim 6 further comprising:

rendering a percentage of the fees collected from the patron as payment to the interactive shop.

9. A method according to claim 6 further comprising:

rendering a percentage of the fees collected from the patron as payment to the provider providing the market portal.

10. A method according to claim 1, wherein the step of selecting service providers is performed in anticipation of the placement of an order for print services.

11. A method according to claim 1, wherein the step of selecting service providers is performed in response to the placement of an order for print services.

12. A method according to claim 1, further comprising:

establishing a relationship between the interactive shop and a selected service provider guaranteeing the purchase and supply respectively of a certain quantity of a given service; and updating the market information to specify the quantity of the given service guaranteed.

13. A method according to claim 12 further comprising: updating the quantity to reflect filled orders of the print services.

14. A method according to claim 1 wherein the market information includes an identity of interactive shops.

15. A computer-readable memory medium storing computer-executable process steps to create, via a network, a print market place, in which a market portal gathers information from a service provider and an interactive shop to create a relationship between the service provider and the interactive shop, and the interactive shop offers products and/or services to its customers, the steps comprising:

a collecting step to collect, by the market portal, market information comprising an identity of service providers and the print services and pricing provided by each of the service providers;

storing, by the market portal, the market information;

an obtaining step to obtain, by the market portal, criteria established by an interactive shop for selecting service providers to provide print services, wherein the criteria is edited using a selection criteria interface which comprises a listing of a plurality of categories for selection of service providers and possible input; and a selecting step to select, by the market portal, one or more service providers identified using the market information to provide the set of print services based on the criteria and the market information, wherein the interactive shop offers products and services to its customers via a graphical user interface by which a customer of the interactive shop orders products and services offered by the interactive shop, and wherein the print services and pricing information is collected and the selection criteria is obtained independent of an order by a customer.

* * * * *

UNITED STATES PATENT AND TRADEMARK OFFICE
CERTIFICATE OF CORRECTION

PATENT NO. : 6,980,964 B1
APPLICATION NO. : 09/627401
DATED : December 27, 2005
INVENTOR(S) : Thomas A. Cocotis et al.

It is certified that error appears in the above-identified patent and that said Letters Patent is hereby corrected as shown below:

COLUMN 6
  Line 5, "15, 16 and 16" should read --15, 16 and 17--.

COLUMN 11
  Line 45, "agreement)." should read --agreement.--.

COLUMN 12
  Line 17, "interface." should read --interface).--.

COLUMN 14
  Line 19, "wherein the" should read --wherein an order is placed in the interactive shop, the--.

Signed and Sealed this

Twenty-ninth Day of August, 2006

JON W. DUDAS
*Director of the United States Patent and Trademark Office*